(12) United States Patent
Ryu et al.

(10) Patent No.: US 7,868,258 B2
(45) Date of Patent: Jan. 11, 2011

(54) RADIO FREQUENCY MODULE ASSEMBLY

(75) Inventors: Jong Gi Ryu, Gyunggi-do (KR); In Jong Jang, Gyunggi-do (KR); Ki Hoon Won, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 154 days.

(21) Appl. No.: 12/199,682

(22) Filed: Aug. 27, 2008

(65) Prior Publication Data

US 2009/0059539 A1 Mar. 5, 2009

(30) Foreign Application Priority Data

Aug. 28, 2007 (KR) .................. 10-2007-0086409
Nov. 8, 2007 (KR) .................. 10-2007-0113550

(51) Int. Cl.
*H05K 7/02* (2006.01)
(52) U.S. Cl. .................. 174/541; 174/535; 361/752
(58) Field of Classification Search .......... 174/520, 174/535, 541, 560; 361/752
See application file for complete search history.

(56) References Cited

U.S. PATENT DOCUMENTS

| | | | | |
|---|---|---|---|---|
| 4,661,888 A | * | 4/1987 | Jewell et al. | ............... 361/818 |
| 4,980,516 A | * | 12/1990 | Nakagawa | ................. 174/358 |
| 7,170,002 B2 | * | 1/2007 | Thompson | ................. 174/51 |
| 2005/0272399 A1 | | 12/2005 | Murata | |

FOREIGN PATENT DOCUMENTS

| | | |
|---|---|---|
| JP | 2005-317847 A1 | 11/2005 |
| KR | 1989-0001852 U | 3/1989 |
| KR | 1999-008538 U | 3/1999 |
| KR | 10-2004-0044038 A | 5/2004 |

\* cited by examiner

*Primary Examiner*—Hung V Ngo
(74) *Attorney, Agent, or Firm*—Lowe Hauptman Ham & Berner LLP (57) ABSTRACT

A radio frequency (RF) module assembly includes a substrate on which a predetermined component is mounted, the substrate comprising a connection terminal, and an RF module mounted on the substrate and processing a predetermined RF signal. The RF module includes a housing forming a body, a jack receiving and transmitting a predetermined RF signal, a jack receiving part provided at the housing to allow the jack to be inserted inside the housing and received, and a terminal connected to a connection terminal of the substrate.

22 Claims, 5 Drawing Sheets

RADIO FREQUENCY MODULE ASSEMBLY

CROSS-REFERENCE TO RELATED APPLICATIONS

This application claims the priority of Korean Patent Application No. 2007-86409 filed on Aug. 28, 2007, and Korean Patent Application No. 2007-113550 filed on Nov. 8, 2007, in the Korean Intellectual Property Office, the disclosure of which is incorporated herein by reference.

BACKGROUND OF THE INVENTION

1. Field of the Invention

The present invention relates to a radio frequency (RF) module assembly, and more particularly, to a device used in a television or the like to receive, transmit and process an RF signal.

2. Description of the Related Art

Radio frequency (RF) modules refer to modules that process an RF signal. The RF modules are used to generate and receive an RF signal.

A tuner among the RF modules is an electronic component which is attached to a TV or a radio to perform tuning and reception of various frequency signals.

A tuner used for a TV is connected with an antenna by a cable. Thus, the tuner receives an RF signal from the outside, and converts the RF signal into an intermediate frequency (IF) signal. Thereafter, the tuner performs detection on the IF signal to separately output a video signal and an audio signal. A tuner used for a radio performs detection in a circuit receiving amplitude modulation (AM) or frequency modulation (FM) broadcasting, thereby extracting an audio waveform.

The tuner is mounted within an electronic product, attached to a printed circuit board (PCB) performing various functions. The tuner performs various functions with various kinds of semiconductor devices provided on the PCB.

The tuner has a connection terminal protruding to the outside for a connection with external equipment.

However, if the tuner is disposed on the PCB, a portion of the PCB where the tuner is disposed becomes a dead zone in which no components or circuits are placed. This decreases the degree of freedom in PCB design in terms of slimness of an entire device, and heat-release performance concerning closely placed components.

Also, the tuner operating on the PCB generates noise, which has a bad influence upon each component mounted on the PCB.

The tuner is structurally unstable because a coupling portion of a protruding jack of the tuner is bent or broken due to external force or impact. Also, the protruding jack hinders the sliminess of a device.

SUMMARY OF THE INVENTION

An aspect of the present invention provides a radio frequency (RF) module assembly which can increase the degree of freedom in substrate design by minimizing a substrate area occupied by an RF module, and facilitate release of heat generated during an operation of the RF module.

An aspect of the present invention also provides an RF module assembly which can achieve structural stability of an RF module and miniaturization of a device.

According to an aspect of the present invention, there is provided a radio frequency (RF) module assembly including: a substrate on which a predetermined component is mounted, the substrate including a connection terminal; and an RF module mounted on the substrate and processing a predetermined RF signal. The RF module includes a housing forming a body; a jack receiving and transmitting a predetermined RF signal; a jack receiving part provided at the housing to allow the jack to be inserted and received in the housing; and a terminal connected to a connection terminal of the substrate.

The housing may include: a module substrate on which a predetermined component is mounted, the module substrate being electrically connected to the terminal; and an upper cover covering the module substrate. The jack receiving part may be provided at one side of the upper cover.

The jack receiving part may include a jack connection hole provided such that the jack passes through the upper cover and is connected to the module substrate and a lower end portion of the jack is placed between the module substrate and the upper cover.

The jack may include a connection terminal electrically connected to the module substrate through the jack connection hole.

A height of the jack protruding from the jack connection hole may be controlled through length control of the connection terminal.

The jack may include a stopper provided at an outer circumferential surface thereof to prevent separation of the jack from the jack connection hole.

The jack receiving part may include a coupling portion recessed in the upper cover to a predetermined depth such that a predetermined portion of the jack is placed therein.

A length between upper and lower ends of the coupling portion may be substantially the same as a height of the jack or may be longer than a length between a lower end portion and a central portion of a body of the jack.

The coupling portion may include a coupling hole provided in a lower end of the coupling portion, and a lower end portion of the jack may be inserted in and coupled to the coupling hole.

The jack may include a connection terminal electrically connected to the module substrate through the coupling hole.

A height of the jack protruding from the coupling portion may be controlled through length control of the connection terminal.

The coupling portion may have a diameter greater than that of the jack.

The connection terminal may be provided at one side of an edge of the substrate, and the RF module may be disposed substantially parallel to a side of the substrate, and the terminal connected to the connection terminal of the substrate may protrude from a side end portion of the RF module.

The RF module assembly may further include a main substrate on which the substrate is mounted. The RF module may include at least one fixing end protruding from an outer surface to be fixed to the main substrate.

The RF module assembly may further include a coupling member coupled with the fixing end and fixing the fixing end to the main substrate.

The RF module assembly may further include a protrusion protruding from the main substrate to a predetermined height and coupled with the coupling member together with the fixing end.

The RF module assembly may further include an external case in which the substrate is mounted. The RF module may include at least one fixing end protruding from an outer surface to be fixed to the external case.

The RF module assembly may further include: a frame provided at one side inside the external case and having a predetermined thickness; and a coupling member coupled with the fixing end and fixing the fixing end to the frame.

The substrate may include a receiving portion recessed in one surface of the substrate to a predetermined depth, and the RF module may be received in the receiving portion.

The RF module assembly may further include: a fixing groove provided at one side of the receiving portion; and a fixing protrusion provided at one side of the housing of the RF module and coupled to the fixing groove to fix the RF module to the receiving portion.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
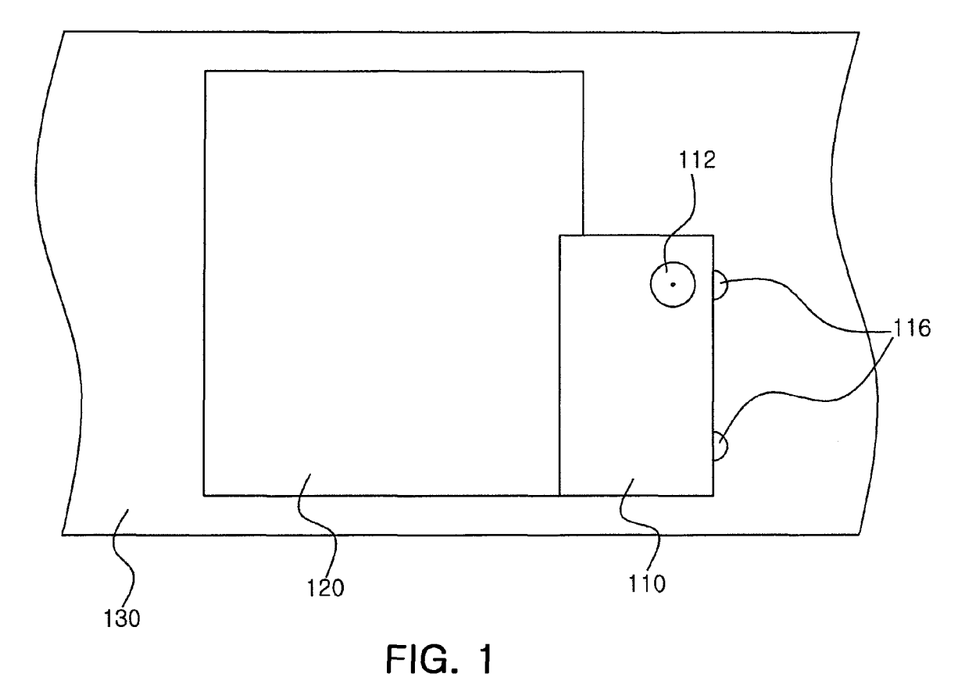
FIG. 1 is a plan view of an RF module assembly according to an exemplary embodiment of the present invention.
Figure 2:
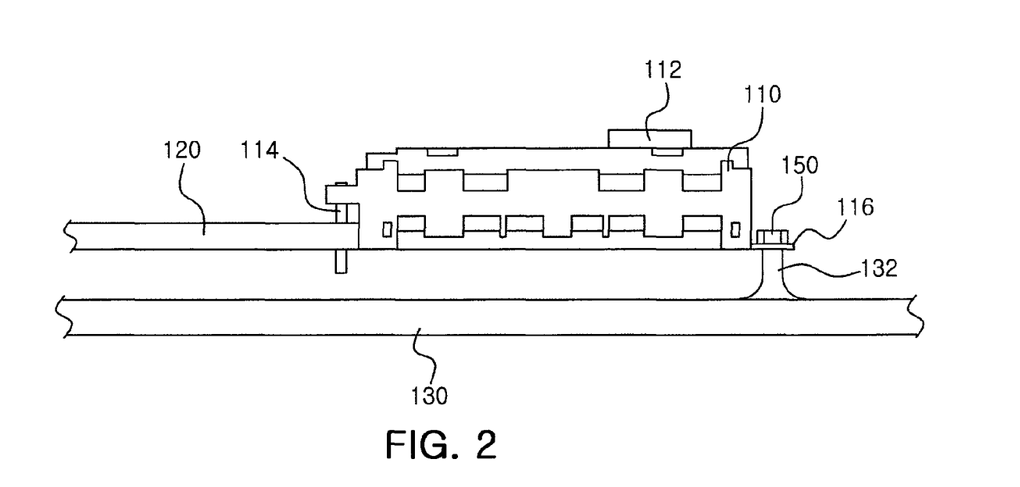
FIG. 2 is a side view of the RF module assembly of FIG. 1.
Figure 3:
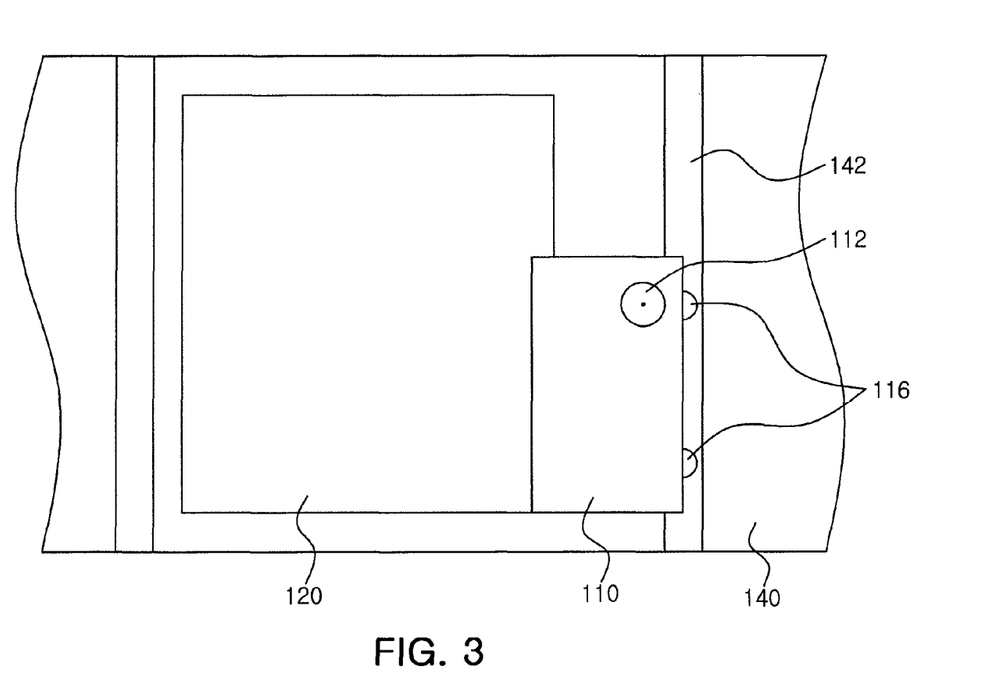
FIG. 3 is a plan view of an RF module assembly according to another exemplary embodiment of the present invention.
Figure 4:
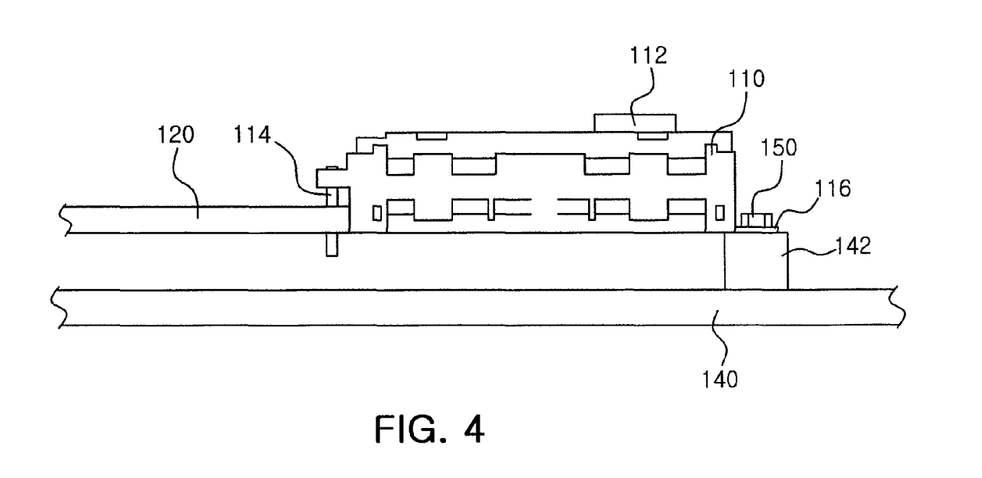
FIG. 4 is a side view of the RF module assembly of FIG. 3.

FIG. 1 is a plan view of a radio frequency (RF) module assembly according to an exemplary embodiment of the present invention, and FIG. 2 is a side view of the RF module assembly of FIG. 1. FIG. 3 is a plan view of an RF module assembly according to another exemplary embodiment of the present invention, and FIG. 4 is a side view of the RF module assembly of FIG. 3.

Referring to FIGS. 1 and 2, the RF module assembly according to the exemplary embodiment of the present invention includes an RF module 110 and a substrate 120.

The substrate 120 is a substrate member and may have various shapes. A pattern circuit is printed on a top surface of the substrate 120, and an electronic component including at least one active device or passive device is mounted on the top surface thereof.

The substrate 120 includes a connection terminal (not shown) at its edge. The connection terminal is connected to the pattern circuit, and is electrically connected to a terminal 114 of the RF module 110 at a location corresponding to the RF module 110. The connection terminal may be provided variously according to the form of the terminal 114. For example, the connection terminal may be provided as a pin-hole, a connector or the like.

The RF module 110 is an electronic component processing an RF signal. The RF module 110 may be a tuner converting an RF signal into an intermediate frequency (IF), or any kind of RF module that processes an RF signal. In the drawing, as an example, the RF module is illustrated as a horizontal tuner provided for a slim TV such as a liquid crystal display (LCD) and a plasma display panel (PDP).

The RF module 110 may include a jack 112 connected to a predetermined cable (not shown) and receiving a predetermined RF signal through the cable. The RF module 110 may include a terminal 114 at its one side. The terminal 114 is electrically connected to the connection terminal provided on the substrate 120.

The terminal 114 corresponds to an output terminal, and may be provided as a plurality of connection pins. However, the present invention is not limited thereto, and the terminal 114 may be provided in a variety of forms such as a connector, according to needs.

When the RF module 110 is disposed parallel to one side of the substrate 120, the terminal 114 may be electrically connected to the connection terminal provided at an edge of the substrate 120 by soldering.

The RF module 110 may include at least one fixing end 116 protruding to the outside.

The fixing end 116 may have a plate shape including a hole or a U-shaped groove through which a coupling member 150 passes. Since the coupling member 150 is coupled to another member which is not the substrate 120, the RF module 110 can be stably fixed. A screw or the like may be used as the coupling member 150.

The substrate 120 to which the RF module 110 is electrically connected is mounted on a main substrate 130, and the coupling member 150 penetrating the fixing end 116 provided at the RF module 110 is fixed to the main substrate 130. Accordingly, the RF module 110 is stably supported so as to be fixed horizontally to the substrate 120.

The direct connection between the RF module 110 and the main substrate 130 may achieve a ground shielding effect by connecting the RF module 110 to a ground terminal (not shown) provided at the main substrate 130.

The main substrate 130 may include a protrusion 132 protruding to a predetermined height. In this case, when the RF module 110 and the main substrate 130 are coupled together, the protrusion 132 creates a predetermined space between the RF module 110 and the main substrate 130.

The space serves to facilitate heat release to the outside by using convection of heat generated during an operation of the RF module 110. Thus, surrounding electronic components can be prevented from deteriorating, and damage to the RF module 110 caused by heat can be minimized.

Since the RF module 110 is disposed parallel to one side of the substrate 120, not on the substrate 120, a substrate area occupied by the RF module 110 is limited only to a portion to which the terminal 114 is connected. Accordingly, the degree of freedom in design of the substrate 120 can be improved.

As shown in FIGS. 3 and 4, in an RF module assembly according to another exemplary embodiment of the present invention, the RF module 110 may be fixed to an external case 140.

Like reference numerals refer to like elements throughout FIGS. 1 through 4. The detailed description of the like elements will be omitted.

The substrate 120 is disposed at the external case 140. A frame 142 supporting the shape of the external case 140 may be provided at an outer edge of the substrate 120.

The frame 142 has a predetermined thickness from one surface of the external case 140 to which the substrate 120 is disposed. The substrate 120 is spaced apart from the frame 142 at a predetermined interval therebetween.

The RF module 110 is electrically connected to a connection terminal (not shown) provided at one side of the substrate 120. The RF module 110 includes a fixing end 116 at its outer surface.

The coupling member 150 for fixing the RF module 110 penetrates the fixing end 116 to be coupled with the frame 142. Thus, the RF module 110 is disposed at the external case 140 including the frame 142 so as to be stably supported together with the substrate 120.

As mentioned above, the frame 142 has a predetermined thickness. Thus, when the RF module 110 is coupled, a predetermined space is created between one surface of the external case 140 and the RF module 110 because of the thickness of the frame 142. This space facilitates heat release from the RF module 110.

Since the RF module is disposed parallel to one side of the substrate in the RF module assembly, sliminess can be achieved, and the degree of freedom in the substrate design can be improved. Also, heat release of the RF module can be facilitated.

An RF module used in the RF module assembly according to the exemplary embodiment of the present invention will now be described in more detail with reference to FIGS. 5 through 8.

The RF module employed in the RF module assembly will now be described with reference to FIGS. 5 and 6, according to an exemplary embodiment of the present invention.

Figure 5:
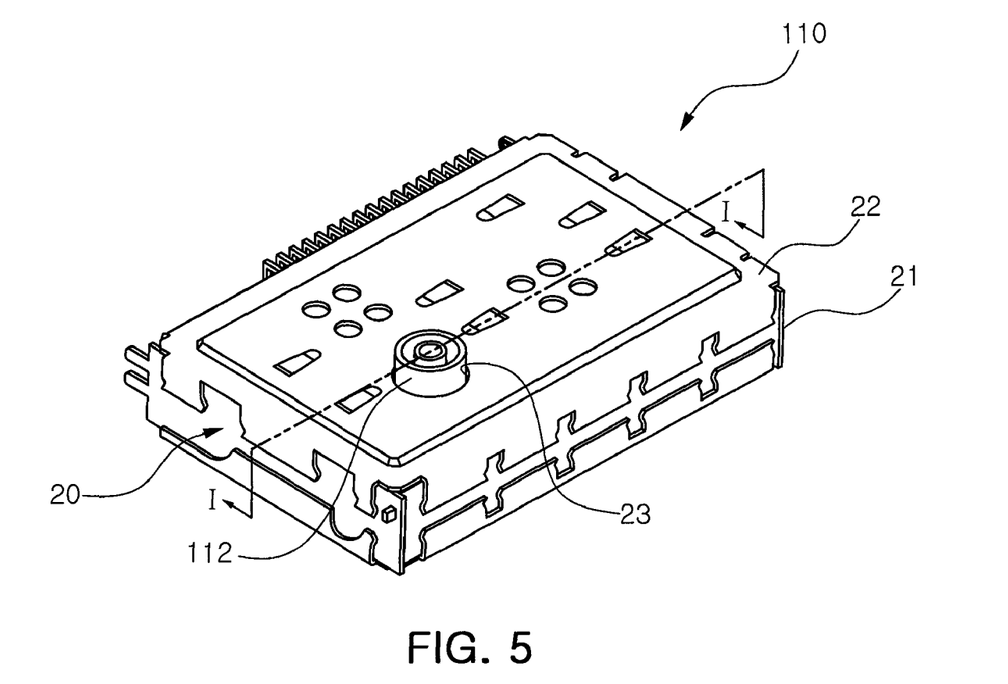
FIG. 5 is a view illustrating an RF module used in an RF module assembly, according to an exemplary embodiment of the present invention.
Figure 6:
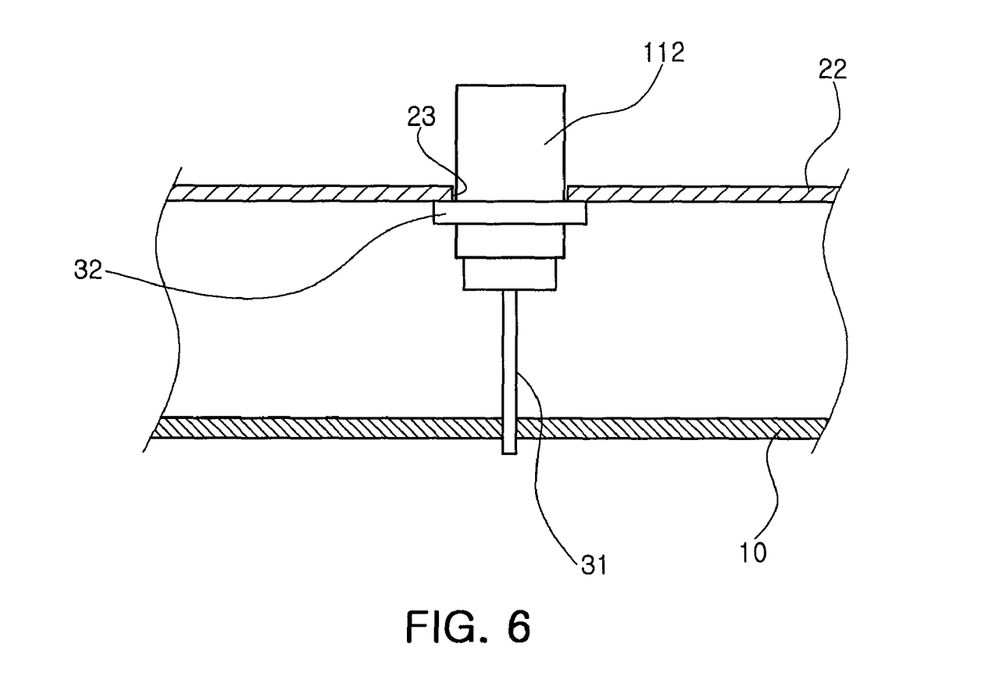
FIG. 6 is a schematic view taken along line I-I of the RF module of FIG. 5.

Referring to FIGS. 5 and 6, the RF module 110 of the RF module assembly according to the current embodiment includes a housing 20 and a jack 112 provided at the housing 20.

The housing 20 includes a module substrate 10 on which at least one electronic component is mounted, and an upper cover 22 covering the module substrate 10 to protect components mounted on the module substrate 10.

Referring to FIGS. 5 and 6, the housing 20 may further include a plurality of vertical partition walls 21 provided along an outer edge of the module substrate 10.

The housing 20 may be formed of a rigid material such as a metal material since it protects the module substrate 10 therein.

The upper cover 22 is provided with a jack receiving part in which the jack 112 is received.

Referring to FIGS. 5 and 6, a jack connection hole 23 having a predetermined size is penetratingly formed in the upper cover 22 as one example of the jack receiving part.

Accordingly, the jack 112 is disposed perpendicularly to the module substrate 10 through the jack connection hole 23. A connection terminal 31 of the jack 30 is electrically connected to a terminal of the module substrate 10.

That is, the jack 112 is inserted in the jack connection hole 23 formed in the upper cover 22. Thus, the jack 112 electrically connected to the module substrate 10 passes through the jack connection hole 23, disposed substantially perpendicularly onto the module substrate 10.

An upper end portion of a body of the jack 112 protrudes to the outside through the jack connection hole 23 so that an external antenna (not shown) can be easily inserted in the jack 112. Also, a lower end portion of the body of the jack 112 is placed between the module substrate 10 and the upper cover 22 so that the connection terminal 31 placed on a bottom surface of the body of the jack 112 is electrically connected to the module substrate 10.

The height of the jack 112 protruding to the outside through the jack connection hole 23 can be controlled by controlling a length of the connection terminal 31.

The upper end portion of the jack 112 may be flush with the upper cover 220 so that there is no protruding portion.

A gap between the jack 112 and the jack connection hole 23 may be sealed by an insulating material such as rubber or plastic.

The jack 112 includes a stopper 32 around an outer circumferential surface of the body in order to prevent separation of the jack 112 from the jack connection hole 23.

The stopper 32 may contact a bottom surface of the upper cover 22 with reference the jack connection hole 23 where the jack 112 contacts the upper cover 22. Another stopper may be further provided on a top surface of the upper cover 22.

The stopper 32 is provided around an outer circumferential surface of the body of the jack 112, as a ring shape having a diameter greater than the jack connection hole 23 or as discontinued protrusions. The stopper 32 is coupled with the upper cover 22 so as to fix the jack 112.

An RF module employed in an RF module assembly will now be described with reference to FIGS. 7 and 8 according to another exemplary embodiment of the present invention.

An RF module 110 of the RF module assembly according to the current embodiment includes the housing 20 and the jack 112 provided at the housing 20, as in the embodiment of FIGS. 5 and 6. The housing 20 includes the upper cover 22, the vertical partition wall 21 and the like.

Those elements are substantially the same as in the embodiment of FIGS. 5 and 6, and thus the detailed description thereof will be omitted. The current embodiment is different from another embodiment in terms of a jack receiving part of the RF module. Thus, the jack receiving part of the RF module according to the current embodiment will now be described in more detail.

Figure 7:
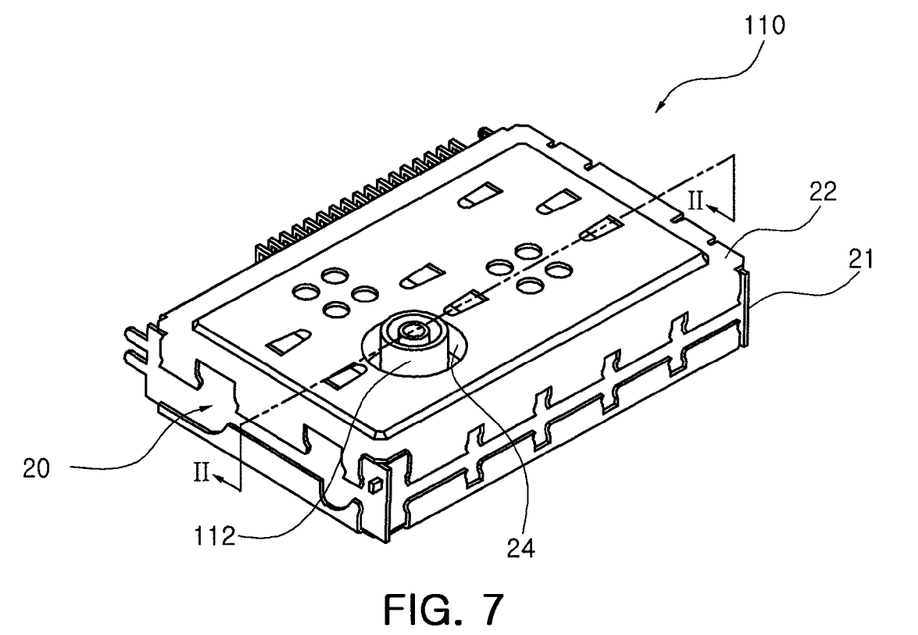
FIG. 7 is a view illustrating an RF module used in an RF module assembly, according to another exemplary embodiment of the present invention.
Figure 8:
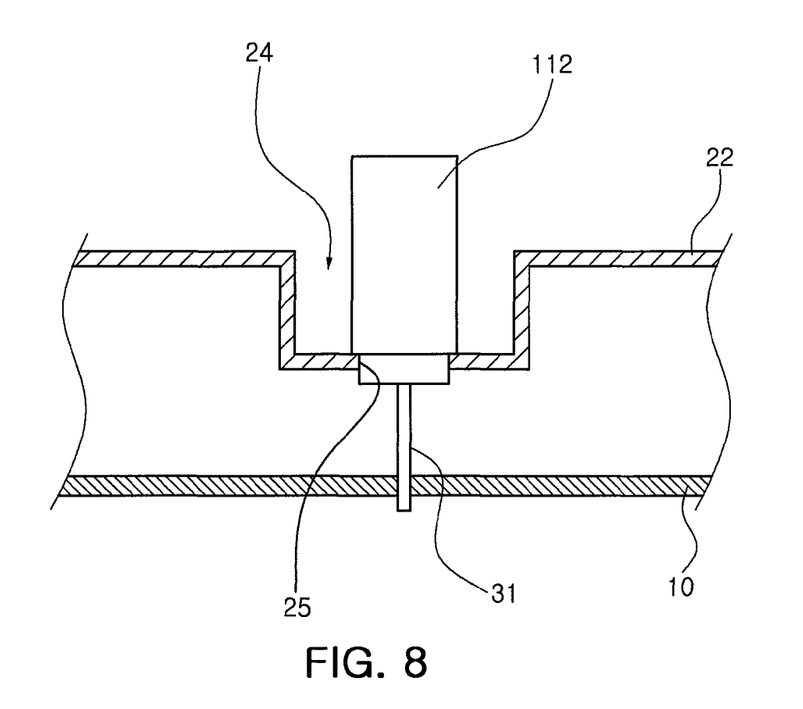
FIG. 8 is a schematic view taken along line II-II of the RF module of FIG. 7.

As shown in FIGS. 7 and 8, the jack receiving part of the RF module 110 of the RF module assembly according to the current embodiment includes a coupling portion 24 recessed in the upper cover 22 to a predetermined depth. The coupling portion 24 is provided so that a predetermined part of the jack 112 is placed therein.

The coupling portion 24 is described as a recess formed in the upper cover 22 at a predetermined depth. However, the present invention is not limited thereto, and a hole may be formed in the upper cover 22 and then a separate structure corresponding to the coupling portion 24 may be installed in the hole.

The coupling portion 24 has a circular shape corresponding to an exterior of the jack 112. A diameter of the coupling portion 24 may be greater than that of the jack 112.

A length between an upper end and a lower end of the coupling portion 24 may be equal to the height of the jack 112. Alternatively, the length between the upper and lower ends of the coupling portion 24 may be longer than a length between a central portion and a lower end portion of the body of the jack 112.

The jack 112 is fixed by being coupled with an end surface within the coupling portion 24. Because of this structural shape of the coupling portion 24, an upper end portion of the body of the jack 112 partially protrudes outward from the coupling portion 24, and a lower end portion of the jack 112 is disposed inside the coupling portion 24 and fixed to the end surface of the coupling portion 24.

If the depth of the coupling portion 24 is the same as the height of the jack 112, the jack 112 does not protrude outward from the upper cover 22.

As shown in FIG. 8, a coupling hole 25 may be provided in the lower end portion of the coupling portion 24. The lower end portion of the jack 112 is inserted in and coupled to the coupling hole 25.

The jack 112 and the module substrate 31 are connected together by the connection terminal 31 through the coupling hole 25. The height of the jack 112 protruding from the coupling portion 24 can be controlled by controlling the length of the connection terminal 31.

An RF module assembly according to another exemplary embodiment of the present invention will now be described with reference to FIGS. 9 and 10.

Figure 9:
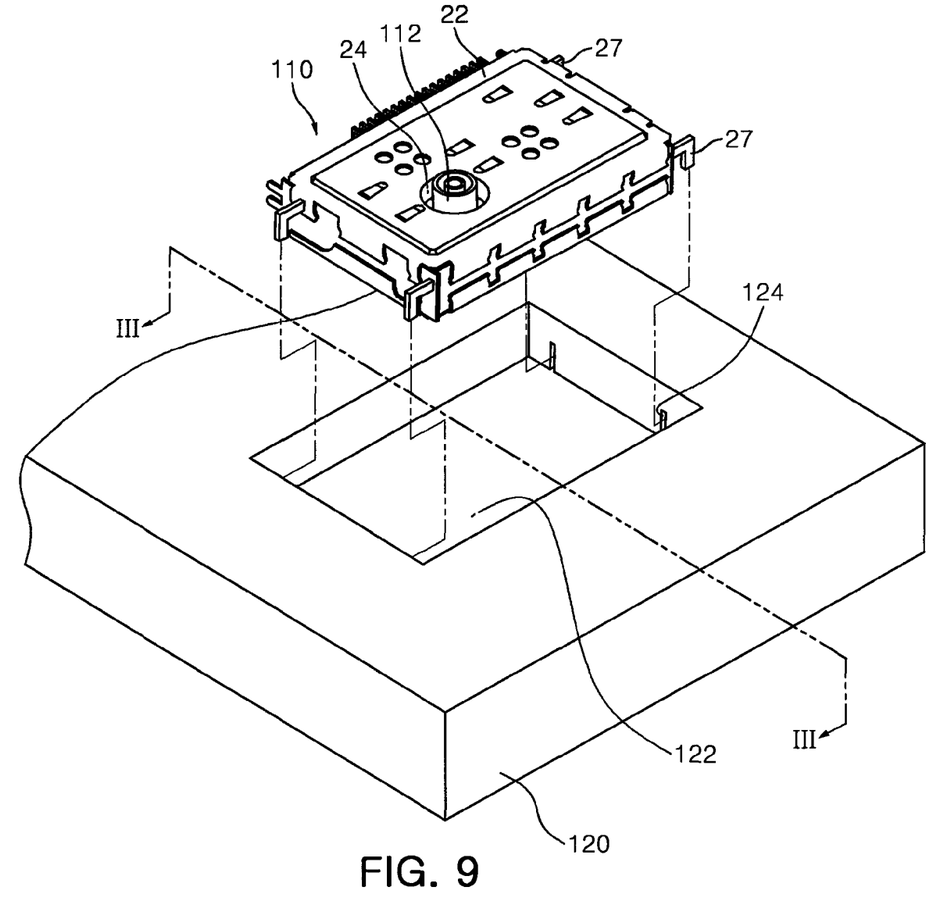
FIG. 9 is a perspective view of an RF module assembly according to another exemplary embodiment of the present invention.

FIG. 9 is a perspective view of an RF module assembly according to another exemplary embodiment of the present invention. FIG. 10 is a cross-sectional view taken along line III-III of FIG. 9.

Figure 10:
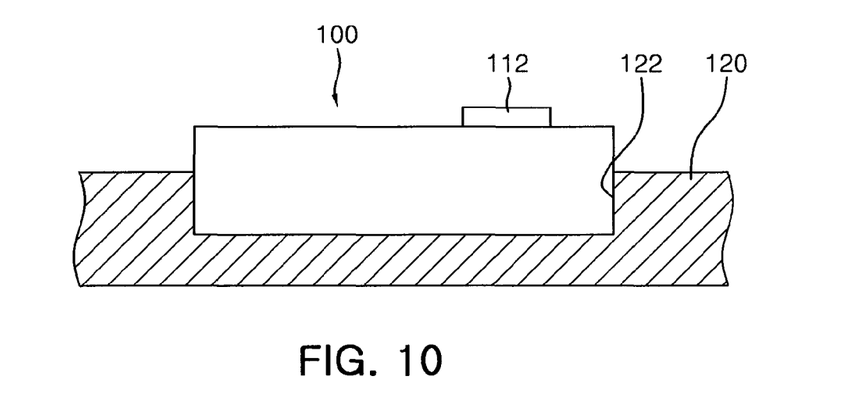
FIG. 10 is a schematic view taken along line III-III of FIG. 9.

As shown in FIGS. 9 and 10, a substrate 120 of the RF module assembly according to the current embodiment includes a receiving portion 122 recessed to provide a predetermined receiving space.

Since the RF module 110 is inserted in the receiving portion 122 as shown in FIG. 10, the entire RF module assembly can have a slim size.

Other elements of the RF module 110 according to the current embodiment are the same as in the embodiments of FIGS. 5 through 8. Therefore, the detailed description thereof will be omitted.

A fixing protrusion 27 may be provided at each of end portions of the housing 22 of the RF module 110. A fixing groove 124 corresponding to the fixing protrusion 27 may be provided at each of end portions of the receiving portion 122 of the substrate 120.

Accordingly, when the RF module 110 is mounted in the receiving portion 122 of the substrate 120, the fixing protrusion 27 is fixed into the fixing groove 124 so that the RF module 110 can be stably fixed to the substrate 120.

The RF module assembly according to the present invention includes the RF module connected to an edge of the substrate. Thus, a substrate area occupied by the RF module is minimized only to a terminal connection portion. Accordingly, the degree of freedom in substrate design can be improved, and the size of the substrate can be reduced, thereby reducing the cost price.

Since the RF module is disposed parallel to one side of the substrate, heat release can be facilitated through a space created between the RF module and the main substrate or between the RF module and the external case.

Also, the jack is partially inserted into the RF module, thereby obviating bending of the jack, which occurs at a related art jack because of a protrusion structure. Also, since the size of the RF module is reduced, an electronic device can be miniaturized.

Also, the entire RF module assembly can have a slim size.

While the present invention has been shown and described in connection with the exemplary embodiments, it will be apparent to those skilled in the art that modifications and variations can be made without departing from the spirit and scope of the invention as defined by the appended claims.

What is claimed is:

1. A radio frequency (RF) module assembly comprising:
a first substrate on which a predetermined component is mounted, the substrate comprising a connection terminal; and
an RF module mounted on the first substrate and processing a predetermined RF signal, the RF module comprising:
a housing forming a body;
a jack receiving and transmitting a predetermined RF signal;
a jack receiving part provided at the housing to allow the jack to be inserted and received in the housing; and
a terminal connected to the connection terminal of the substrate;
wherein the housing includes a second substrate on which another predetermined component is mounted, the second substrate being electrically connected to the terminal.

2. The RF module of claim 1, wherein the housing comprises:
an upper cover covering the second substrate,
wherein the jack receiving part is provided at one side of the upper cover.

3. The RF module of claim 2, wherein the jack receiving part comprises a jack connection hole provided such that the jack passes through the upper cover and is connected to the second substrate and a lower end portion of the jack is placed between the second substrate and the upper cover.

4. The RF module assembly of claim 3, wherein the jack comprises a connection terminal electrically connected to the second substrate through the jack connection hole.

5. The RF module assembly of claim 4, wherein a height of the jack protruding from the jack connection hole is controlled through length control of the connection terminal.

6. The RF module assembly of claim 3, wherein the jack comprises a stopper provided at an outer circumferential surface thereof to prevent separation of the jack from the jack connection hole.

7. The RF module assembly of claim 2, wherein the jack receiving part comprises a coupling portion recessed in the upper cover to a predetermined depth such that a predetermined portion of the jack is placed therein.

8. The RF module assembly of claim 7, wherein a length between upper and lower ends of the coupling portion is substantially the same as a height of the jack.

9. The RF module assembly of claim 7, wherein the coupling portion comprises a coupling hole provided in a lower end of the coupling portion, and a lower end portion of the jack is inserted in and coupled to the coupling hole.

10. The RF module assembly of claim 9, wherein the jack comprises a connection terminal electrically connected to the second substrate through the coupling hole.

11. The RF module assembly of claim 10, wherein a height of the jack protruding from the coupling portion is controlled through length control of the connection terminal.

12. The RF module assembly of claim 7, wherein the coupling portion has a diameter greater than that of the jack.

13. The RF module assembly of claim 1, wherein the connection terminal is provided at one side of an edge of the first substrate, and
the RF module is disposed substantially parallel to a side of the first substrate, and the terminal connected to the connection terminal of the first substrate protrudes from a side end portion of the RF module.

14. The RF module assembly of claim 13, further comprising a main substrate on which the first substrate is mounted,
wherein the RF module comprises at least one fixing end protruding from an outer surface to be fixed to the main substrate.

15. The RF module assembly of claim 14, further comprising a coupling member coupled with the fixing end and fixing the fixing end to the main substrate.

16. The RF module assembly of claim 15, further comprising a protrusion protruding from the main substrate to a predetermined height and coupled with the coupling member together with the fixing end.

17. The RF module assembly of claim 13, further comprising an external case in which the first substrate is mounted,
wherein the RF module comprises at least one fixing end protruding from an outer surface to be fixed to the external case.

18. The RF module assembly of claim 17, further comprising:
a frame provided at one side inside the external case and having a predetermined thickness; and
a coupling member coupled with the fixing end and fixing the fixing end to the frame.

19. The RF module assembly of claim 1, wherein the first substrate comprises a receiving portion recessed in one surface of the first substrate to a predetermined depth, and
the RF module is received in the receiving portion.

20. The RF module assembly of claim 19, further comprising:
a fixing groove provided at one side of the receiving portion; and
a fixing protrusion provided at one side of the housing of the RF module and coupled to the fixing groove to fix the RF module to the receiving portion.

21. A radio frequency (RF) module assembly comprising:
a first substrate on which a predetermined component is mounted, the substrate comprising a connection terminal; and
an RF module mounted on the substrate and processing a predetermined RF signal, the RF module comprising:
a housing forming a body, the housing including a second substrate on which a predetermined component is mounted, the second substrate being electrically connected to the terminal;
a jack receiving and transmitting a predetermined RF signal;
a jack receiving part provided at the housing to allow the jack to be inserted and received in the housing;
a terminal connected to the connection terminal of the substrate; and
an upper cover covering the second substrate;
wherein the jack receiving part includes a coupling portion recessed in the upper cover to a predetermined depth such that a predetermined portion of the jack is placed therein.

22. A radio frequency (RF) module assembly comprising:
a first substrate on which a predetermined component is mounted, the substrate comprising a connection terminal; and
an RF module mounted on the substrate and processing a predetermined RF signal; and
a main substrate on which the first substrate is mounted, wherein the RF module comprises at least one fixing end protruding from an outer surface of the RF module to be fixed to the main substrate;
wherein the RF module comprising:
a housing forming a body;
a jack receiving and transmitting a predetermined RF signal;
a jack receiving part provided at the housing to allow the jack to be inserted and received in the housing; and
a terminal connected to a connection terminal of the first substrate.

* * * * *